J. W. PORTER & R. L. ARNDT.
TRACTOR TREAD LINK.
APPLICATION FILED FEB. 7, 1917.

1,237,814.

Patented Aug. 21, 1917.

INVENTORS.
J. W. PORTER.
R. L. ARNDT.
BY
Carlos P. Griffin
ATTORNEY.

UNITED STATES PATENT OFFICE.

JOSEPH W. PORTER, OF OAKLAND, AND RICHARD L. ARNDT, OF SAN FRANCISCO, CALIFORNIA.

TRACTOR-TREAD LINK.

1,237,814. Specification of Letters Patent. Patented Aug. 21, 1917.

Application filed February 7, 1917. Serial No. 147,060.

*To all whom it may concern:*

Be it known that we, JOSEPH W. PORTER and RICHARD L. ARNDT, citizens of the United States, residing at Oakland and San Francisco, respectively, in the counties of Alameda and San Francisco, State of California, have invented a new and useful Tractor-Tread Link, of which the following is a specification in such full and clear terms as will enable those skilled in the art to construct and use the same.

This invention relates to a traction tread for engines of the type known as caterpillar tractors and an object of the invention is to produce a chain which is capable of bending around the wheel as it travels forward but which is incapable of bending in the reverse direction, all of the load being supported by the two end drive sprocket wheels.

Another object of the invention is to produce a chain which will have a very large bearing area at the joints and which will be practically dirt proof.

Another object of the invention is to make a chain which will be relatively deep thereby increasing its strength so that it can easily carry the load put upon it even though it is not supported between the large sprocket wheels around which it passes.

Other objects of the invention will appear as the description proceeds.

An embodiment of the invention is shown in the drawing in which the same reference numeral is applied to the same portion throughout, but we are aware that there may be many modifications thereof.

Figure 1:
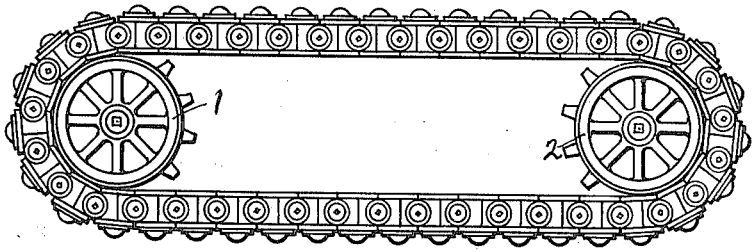
Figure 1 is a side elevation of a chain as it appears in use.
Figure 2:
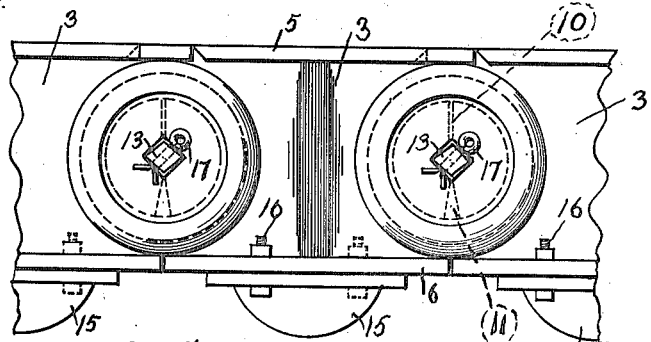
Fig. 2 is an enlarged side view of one link and a portion of two other links.
Figure 3:
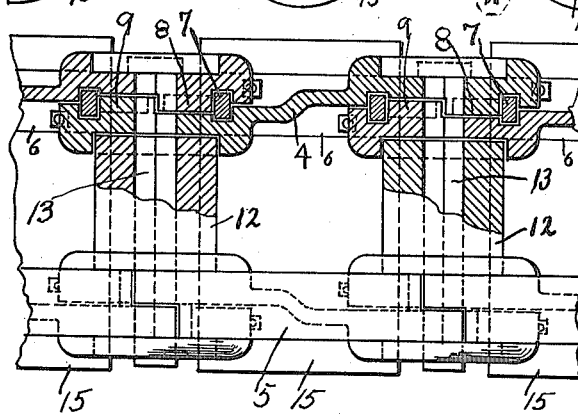
Fig. 3 is a plan view of the links shown in Fig. 2 a portion thereof being shown in section.
Figure 5:
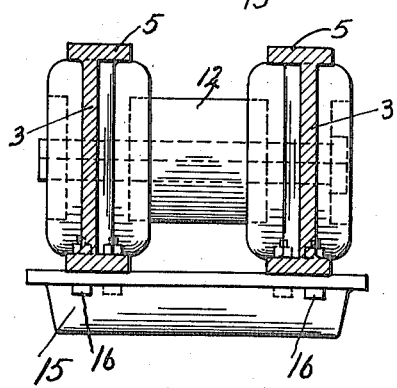
Fig. 5 is a transverse sectional view of the chain showing the roller which bears on the sprocket wheels.
Figure 4:
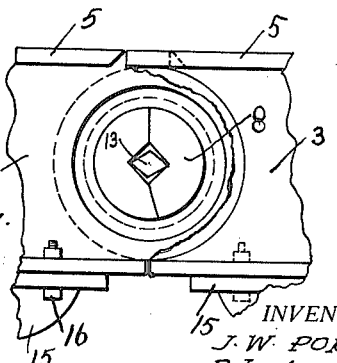
Fig. 4 is a side elevation of one of the link joints a portion of one link being broken away for purposes of illustration.

The numerals 1 and 2 represent the sprocket wheels which may be any desired distance from each other depending on the size of the chain used and the work to be accomplished, small tractor using a short chain while a large one will use a long chain.

The links each consist of a deep web 3 offset as at 4 so that when several of the links are joined together they will all be in a straight line. The webs have flanges 5 at the top and 6 at the bottom, the top flanges being cut away at the ends to allow the links to move enough to pass around the sprocket wheels. The flanges 6 abut against each other when the chain is lying on the ground to prevent the chain from bending up between the two wheels 1 and 2.

The inside of one end of one link has a circular groove which is oppositely positioned with respect to the groove in the adjoining link and the two links bear on one another through the ring 7 which is placed in the adjoining grooves. In addition to the ring the links have oppositely placed lugs 8 and 9 which bear on each other at the top as illustrated at 10 when the pressure on the chain is up and the chain straight but which lugs are wide enough apart at the bottom, see 11, to permit the chain to bend around the sprocket wheels. Each link is provided with a seat for the end of roller 12, which may or may not be movable as desired, and two of the complete connected sets of chains are connected together by means of said rollers and the polygonal pins 13. The polygonal pins 13 bear in the squared holes of the links, but are not closely in contact with the rollers 12. The pins serve to assist in allowing the chain to bend freely in passing around the sprocket wheels the lugs 8, 9 bearing on opposite corners thereof and as said holes are slightly larger than said pin they allow the necessary bending of the chains when passing around the wheels.

Any suitable grouser or foot 15 may be used bolts 16 being used to connect it with the lower flanges 6. Heavy cotter pins 17 may be used to hold the two sections of chain together.

The advantage gained with the present construction lies in the fact that the total weight is carried by the two ground wheels 1 and 2 which can be provided with suitably heavy axles and spokes to carry the load with the least friction and there is not the great wear on the chain as is the case where it runs under a series of other rollers.

Having thus described our invention what we claim as new and desire to secure by Letters Patent of the United States, is as follows:—

1. A chain for tractors comprising a series of pairs of jointed links, the abutting portions of the links having oppositely positioned grooves with bearing ring therein, shoulders on the several links to prevent the chain formed thereby from bending upwardly from the ground level between the wheels around which it passes, and cylindrical spacers between the pairs of links.

2. A chain for tractors comprising a series of pairs of jointed links, a bearing ring holding the two links together longitudinally, and lugs to prevent said links from bending in one direction.

3. A chain for tractors comprising a series of pairs of jointed links, a bearing ring to hold the links together longitudinally, a spacer between the links, lugs to prevent the links from bending in one direction, and pins passing through the links and spacers to hold them together.

4. A chain for tractors comprising a series of pairs of jointed links, a bearing ring holding the links together longitudinally, lugs within the rings to prevent the chain from bending in one direction, spacers between the links, and a polygonal bearing pin passing through the links and holding them against the spacers.

In testimony whereof we have hereunto set our hands January A. D. 1917.

JOSEPH W. PORTER.
RICHARD L. ARNDT.